(12) United States Patent
Aw (10) Patent No.: US 7,597,081 B2
(45) Date of Patent: Oct. 6, 2009

(54) ENGINE SECONDARY AIR SYSTEM

(75) Inventor: Dali Abdul Latiff Aw, Putrajava (MY)

(73) Assignee: Petroliam Nasional Berhad, Kuala Lumpur (MY)

( * ) Notice: Subject to any disclaimer, the term of this patent is extended or adjusted under 35 U.S.C. 154(b) by 330 days.

(21) Appl. No.: 11/545,357

(22) Filed: Oct. 10, 2006

(65) Prior Publication Data

US 2007/0079801 A1    Apr. 12, 2007

(30) Foreign Application Priority Data

Oct. 11, 2005    (MY) .............................. PI 20054775

(51) Int. Cl.
*F02F 1/42*    (2006.01)
*F02B 75/02*    (2006.01)

(52) U.S. Cl. ..................................... 123/193.5; 60/289

(58) Field of Classification Search .............. 123/193.5, 123/193.3, 198 A, 65 PE, 65 EM, 65 P, 699, 123/568.15, 568.11, 568.13, 568.17; 60/289, 60/274, 293, 304–306, 290
See application file for complete search history.

(56) References Cited

U.S. PATENT DOCUMENTS

| | | | | |
|---|---|---|---|---|
| 3,522,702 | A | * | 8/1970 | Grosseau ...................... 60/305 |
| 5,419,125 | A | | 5/1995 | Fukae et al. |
| 5,839,417 | A | * | 11/1998 | Kwiatkowski et al. . 123/568.13 |
| 6,167,699 | B1 | | 1/2001 | Johnston et al. |
| 6,279,550 | B1 | | 8/2001 | Bryant |
| 6,755,725 | B2 | | 6/2004 | Hashish et al. |
| 6,802,181 | B2 | | 10/2004 | Wang et al. |
| 7,197,869 | B2 | * | 4/2007 | Kokubo et al. ................ 60/305 |
| 2003/0070426 | A1 | * | 4/2003 | Duffy .......................... 60/305 |

* cited by examiner

*Primary Examiner*—Michael Cuff
*Assistant Examiner*—Hung Q Nguyen
(74) *Attorney, Agent, or Firm*—Dickinson Wright PLLC (57) ABSTRACT

A secondary air injection system for improving emissions of internal combustion engines. The secondary air injection system includes an engine cylinder head and exhaust system designed to be used with or without a secondary air system.

19 Claims, 11 Drawing Sheets

ENGINE SECONDARY AIR SYSTEM

CROSS-REFERENCE TO RELATED APPLICATION

This application is based upon and claims priority to Malaysian Patent Application No. PI 20054775, filed Oct. 11, 2005, which application is hereby expressly incorporated by reference.

BACKGROUND OF THE INVENTION

The present invention relates to a secondary air injection system for improving emissions of internal combustion engines and an engine cylinder head and exhaust system designed to be used with or without a secondary air system.

During the combustion process, gasoline is combusted and oxidized. More specifically, hydrogen (H) and Carbon (C) components of gasoline combine with components of air, specifically nitrogen ($N_2$) and oxygen ($O_2$), to generally form various chemical components, including carbon dioxide ($CO_2$), water ($H_2O$), carbon monoxide (CO), nitrogen oxides ($NO_x$), sulfur oxides ($SO_x$), and unburned hydrocarbons. In today's vehicles, the exhaust of internal combustion engines is passed through a catalytic converter to reduce emissions. The catalytic converter reduces the unburned hydrocarbons and carbon monoxide (CO), as well as other harmful components of the exhaust, to reduce emissions by acting as a catalyst to complete the reaction of exhaust components to water vapor and carbon dioxide ($CO_2$).

To improve the efficiency of catalytic converters and to complete the combustion process, some vehicles include a secondary air injection system. Secondary air injection systems typically include an air source and a method for injecting air into the exhaust system, typically directly into the exhaust manifold, exhaust header or catalytic converter of an internal combustion engine. The air source is usually an air pump and injects air into the exhaust stream through the exhaust manifold or exhaust headers and is strong enough to overcome the exhaust pressure of the engine. The secondary air injection system also helps on cold start-ups by heating the catalyst of the catalytic converter by further completing the reaction of certain exhaust components to improve emissions while the vehicle is still at a cold operating temperature.

One problem with existing secondary air systems is that the air injection still occurs some distance from the combustion chamber and therefore after a cold start, the effect of the secondary air system may take a longer than desired to operate efficiently. Today, one area of concern is the emissions produced by an internal combustion engine immediately after start-up. Another problem with secondary air systems is that they generally require special exhaust manifolds or special exhaust headers that can only be used with secondary air injections systems and not on vehicles that do not include secondary air systems. For example, if an exhaust manifold includes a secondary air injection system, the exhaust could exit the manifold when an air source is not attached, thereby bypassing the catalytic converter, increasing emissions, and placing noxious components of the exhaust, such as carbon monoxide (CO), in the engine compartment.

Therefore, there is a need for a secondary air injection system that improves efficiency of the combustion of exhaust components quickly on cold start of an internal combustion engine, as well as a secondary air system that uses components that may easily be interchangeable with vehicles not having a secondary air injection system. Further, there is a need for a system that allows for easy conversions of vehicles not having secondary air systems, to vehicles that do have secondary air systems, such as when emissions need to be reduced in a vehicle that has been imported into another area with stricter emission standards.

SUMMARY OF THE INVENTION

The present invention is directed to a secondary air injection system for improving emissions of internal combustion engines and an engine cylinder head and exhaust system designed to be used with or without a secondary air system. The secondary air system also allows for increased efficiency in reducing emissions after a cold-start before the catalytic converter reaches optimal operating temperature.

The secondary air injection system includes a cylinder head for an engine comprising a first exhaust port, a first lightening pocket, and a first air passage between the first exhaust port and the first lightening pocket. The cylinder head may include a second exhaust port and a second air passage extending between the first lightening pocket and the second exhaust port. The cylinder head may further include a third and fourth exhaust ports and a second lightening pocket. Third and fourth air passages also may extend between the second lightening pocket and the third and fourth exhaust ports. The lightening pocket may include a first entrance surface approximately perpendicular to the first air passage. The exhaust ports also include an exhaust port wall and an exit surface proximate to the first air passage, with the exit surface being approximately perpendicular to the first air passage. The exhaust port wall may include a cast dimple that forms the exit surface proximate to the first air passage.

In a second embodiment, the secondary air injection system includes a cylinder head comprising a first side and a second side, a first exhaust port extending between the first and second sides and where the first exhaust port includes an exhaust port wall. A first air passage extends between one of the first and second sides and the exhaust port wall, and wherein the first air passage is approximately perpendicular to a portion of the exhaust port wall proximate to the first air passage.

In a third embodiment, the secondary air system comprises a cylinder head having a first exhaust port, a first lightening pocket and a first air passage extending between the first exhaust port and the first lightening pocket, and an air supply operationally connected to the lightening pocket. The secondary air system may further include an exhaust outlet system connected to the cylinder head and an air entrance passage between the cylinder head and the air supply. The exhaust outlet also includes an integral air supply tube. The lightening pocket also may include an air supply passage, extending approximately perpendicular to the first air passage and wherein the air supply passage is in communication with the air supply and the first air passage. The exhaust manifold or header may include an air supply tube that is in communication with an air entrance passage that communicates with the air supply passage. The lightening pocket includes a main chamber and an air entrance passage, the main chamber and the air entrance passage communicating with the first side and wherein the air supply passage is in communication with the main chamber and the air entrance passage.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
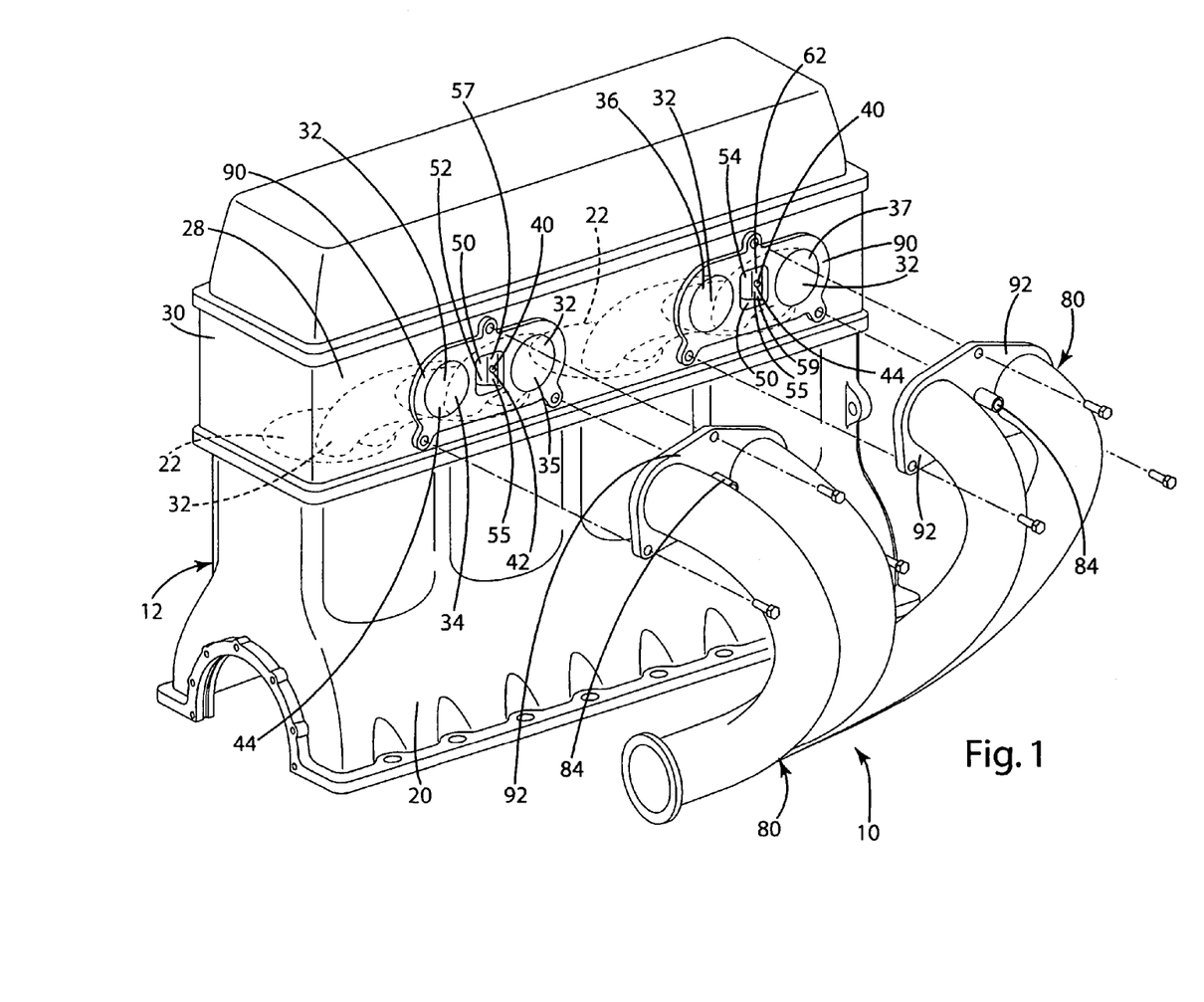
FIG. 1 is a partially exploded perspective view of an engine incorporating components of the secondary air injection system.
Figure 4:
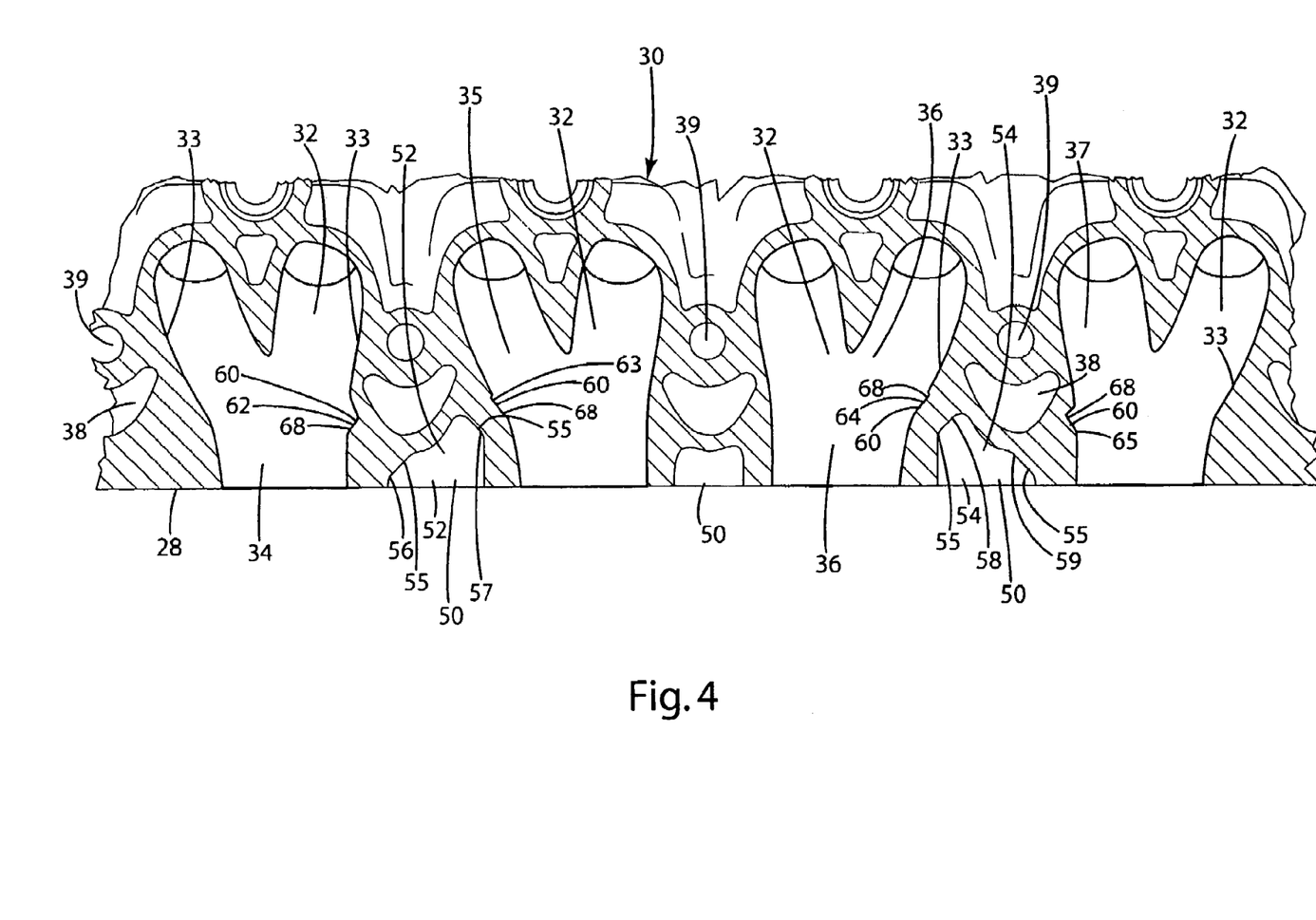
FIG. 4 is a sectional view of the cylinder head of FIG. 2, before adding the air passages in FIG. 2.
Figure 7:
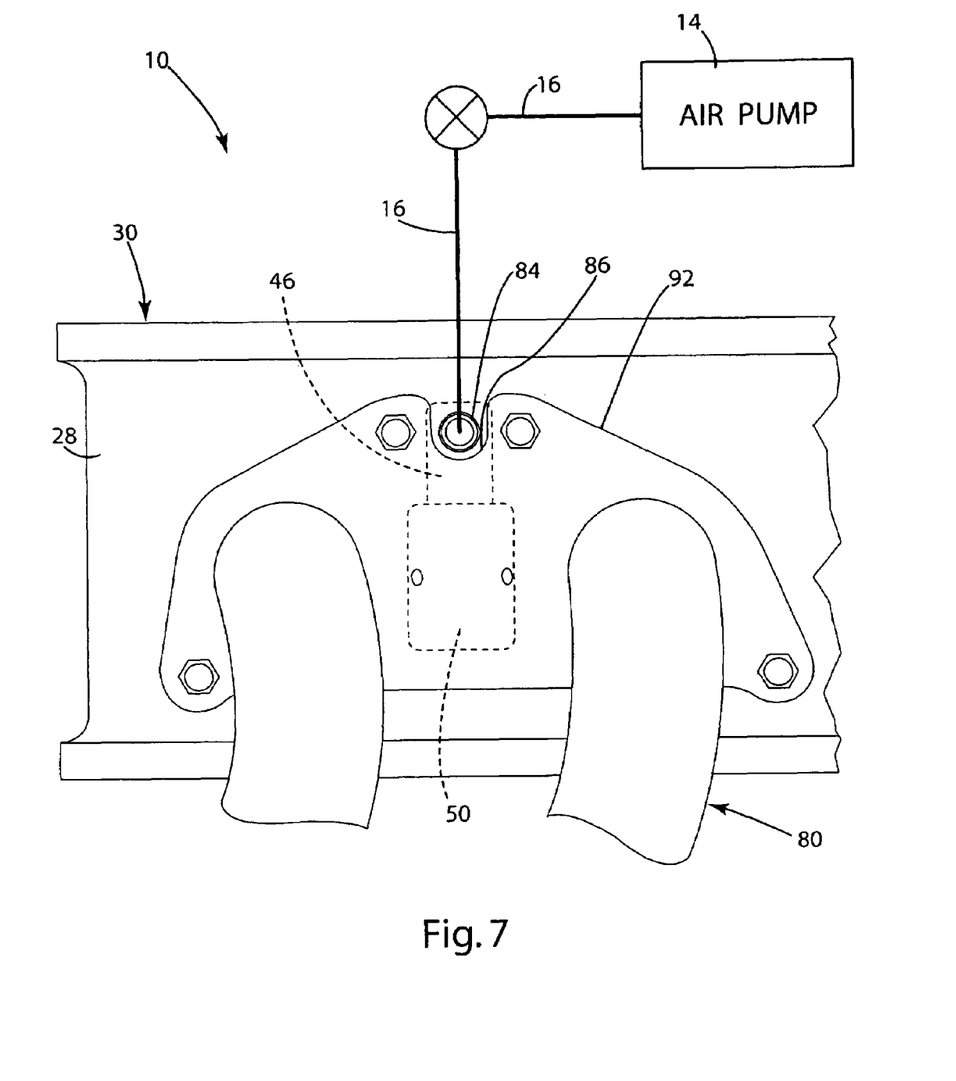
FIG. 7 is an elevational view of the second embodiment cylinder head with a first alternative exhaust header and schematically showing the remaining components of the secondary air injection system.

The cylinder head 30 and exhaust outlet system 80 for a secondary air injection system 10 may be seen in FIG. 1. The secondary air injection system 10 injects air into the exhaust stream of an internal combustions engine 12 to improve emissions. The cylinder head 30 is formed to be used both in internal combustion engines that have secondary air injection systems (FIGS. 1-2), as well as internal combustion engines that do have secondary air injection systems (FIG. 4). The secondary air injection system 10 generally includes an air supply 14, such as an air pump and air supply lines 16 to transfer the air from the air supply 14 to the cylinder head 30 (FIG. 7).

The internal combustion engine 12 generally includes, for the purposes of this invention, an engine block 20 having combustion chambers 22, such as cylinders, the cylinder head 30, and the exhaust outlet system 80 (FIG. 1). During operation of the internal combustion engine, the pistons (not shown) go through a combustion stroke or power stroke where the air fuel mixture in the combustion chambers 22 is ignited. An exhaust stroke follows the combustion stroke, where the exhaust valve 18, shown in FIGS. 3 and 6, opens to allow the piston to force out the exhaust gases during the exhaust stroke, from the combustion of the air and fuel mixture during the power stroke. The exhaust gases then exit from the engine block 20 through the cylinder head 30 and through exhaust outlet system 80 to a catalytic converter (not shown), which is used to reduce emissions.

The engine block 20 is any typical engine block for an internal combustion engine. FIG. 1 illustrates an engine block 20 for an inline four cylinder engine, although a V6, V8, inline 5 cylinder engine block or any other engine block configuration may be used.

The cylinder head 30 is coupled to the engine block 20 with a head gasket (not shown) therebetween. The cylinder head 30 includes exhaust ports 32 having exhaust port walls 33. These exhaust ports 32 are generally cast in when the cylinder head 30 is cast, although any other method of formation may be used. In the illustrated embodiment, for a four cylinder in-line engine, the exhaust ports 32 are illustrated as having a first exhaust port 37, a second exhaust port 36, a third exhaust port 35, and a fourth exhaust port 34 (FIGS. 1-2, 4, and 8-9). The cylinder head 30 may also include oil and water cooling passages 38, as well as bolt holes 39 for bolting the cylinder head to the engine block 20.

Figure 2:
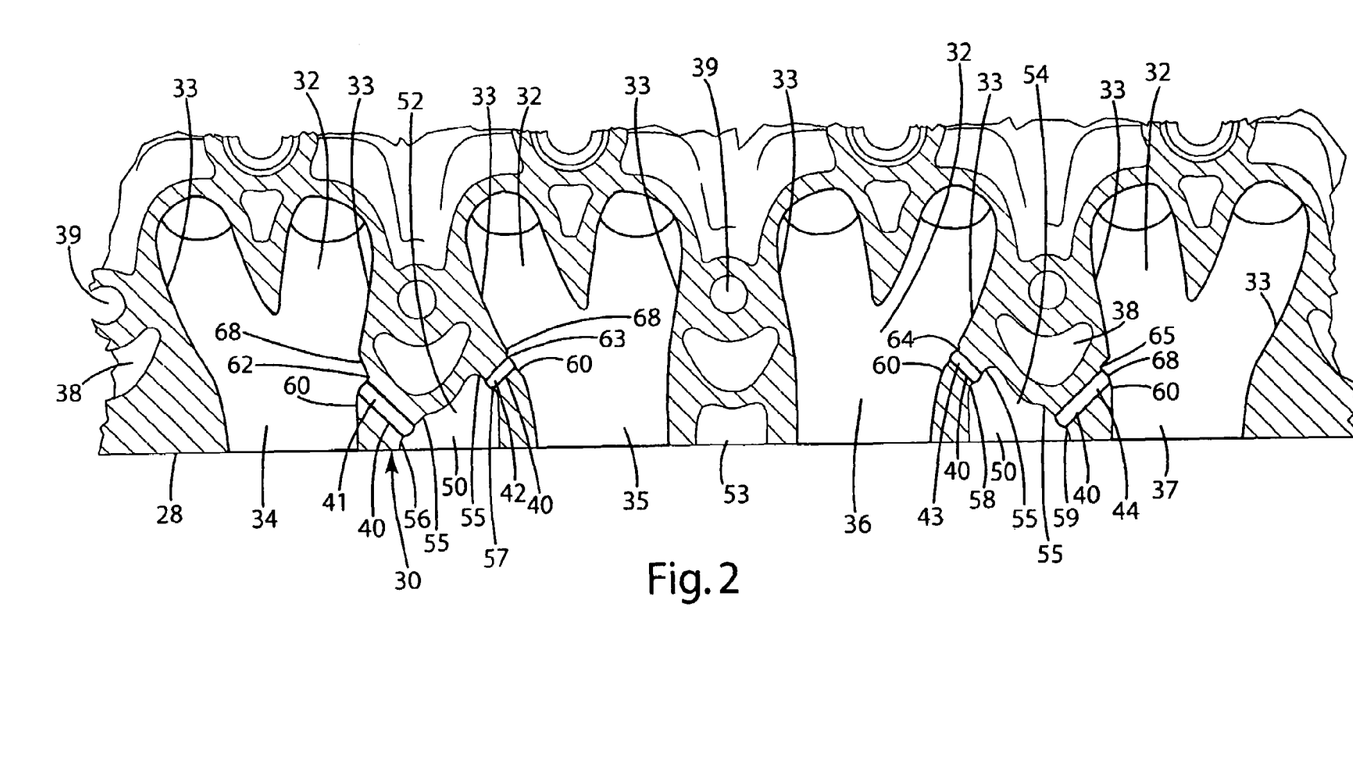
FIG. 2 is a sectional view of a first embodiment of the cylinder head.
Figure 11:
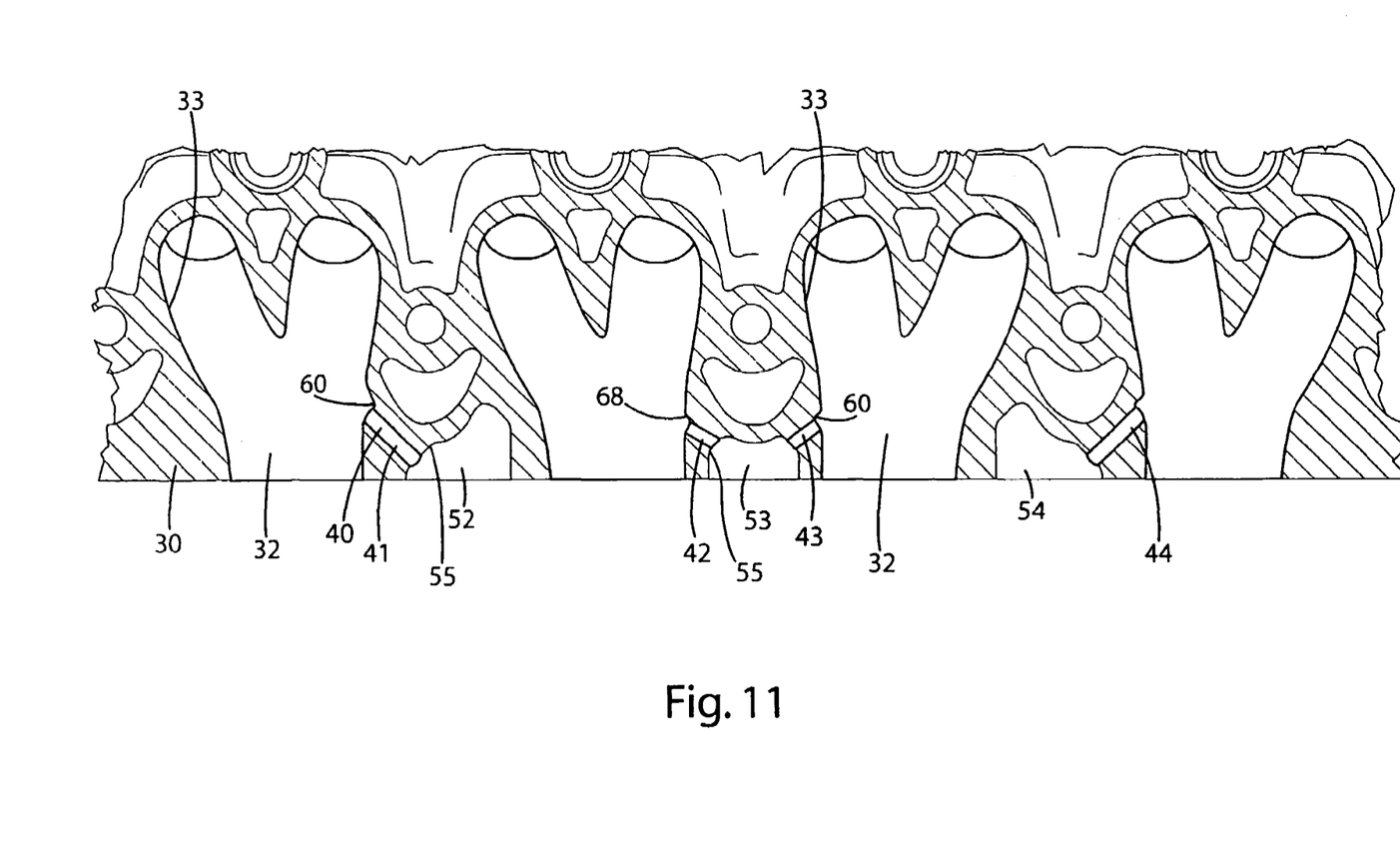
FIG. 11 is a sectional view of the cylinder head showing a fifth alternative embodiment of the cylinder head.

The cylinder head 30 further includes lightening pockets 50, specifically a first lightening pocket 54 and a second lightening pocket 52. The lightening pockets 50 are cast in areas where reinforcement is not needed to produce a lighter weight cylinder head 30. In other engine configurations, the cylinder head may include additional lightening pockets, and an additional lightening pocket 53 may be seen between the first and second lightening pockets 52, 54. If a cylinder head 30 is desired to be adapted for use with a secondary air injection system 10, air passages 40 are added as illustrated in FIG. 2. The air passages 40, in the illustrated embodiment, include a first air passage 44, a second air passage 43, a third air passage 42, and a fourth air passage 41. In the illustrated embodiment, at least one air passage 40 is provided for each cylinder 22, although more or less can be used. Further, if the engine includes more than the four illustrated cylinders, additional air passages may be used, such as an additional air passage for each additional cylinder. As shown in FIG. 11, the additional lightening pocket 53 may also include air passages 40 in some embodiments and some lightening pockets 50 may only be in communication with one exhaust port 32. The cylinder head extends along a longitudinal axis, and having longitudinal side walls, wherein said first and second exhaust ports having exhaust passage openings on one of said longitudinal side walls, and wherein said first lightening pocket extending into one of said longitudinal side walls.

The lightening pockets 50 include entrance surfaces 55 to increase the ease of adding a secondary air injection system 10 to the cylinder head 30 (FIGS. 1-2, 4, 8-9 and 11). The entrance surfaces 55 generally include a first entrance surface 59, a second entrance surface 58, a third entrance surface 57, and a fourth entrance surface 56. An entrance surface 55 is generally provided for each of the air passages 40. The entrance surfaces 55 are generally perpendicular to the axis of the air passages 40 to allow for ease of manufacture. Because in the illustrated embodiment, the cylinder head 30 is cast without the air passages 40, the air passages 40 are drilled after casting. To provide for efficient and low cost manufacturing of a cylinder head 30 with a secondary air injection system 10, the air passages 40 are drilled perpendicular to the entrance surfaces 55 to prevent the drill bit from bending, providing an improper air passage, breaking or increased manufacturing time per cylinder head. The entrance surfaces 55 also are helpful to add a secondary air injection system 10 to an internal combustion engine 12, after the engine has been assembled and even after the engine has been installed in a vehicle.

Figure 8:
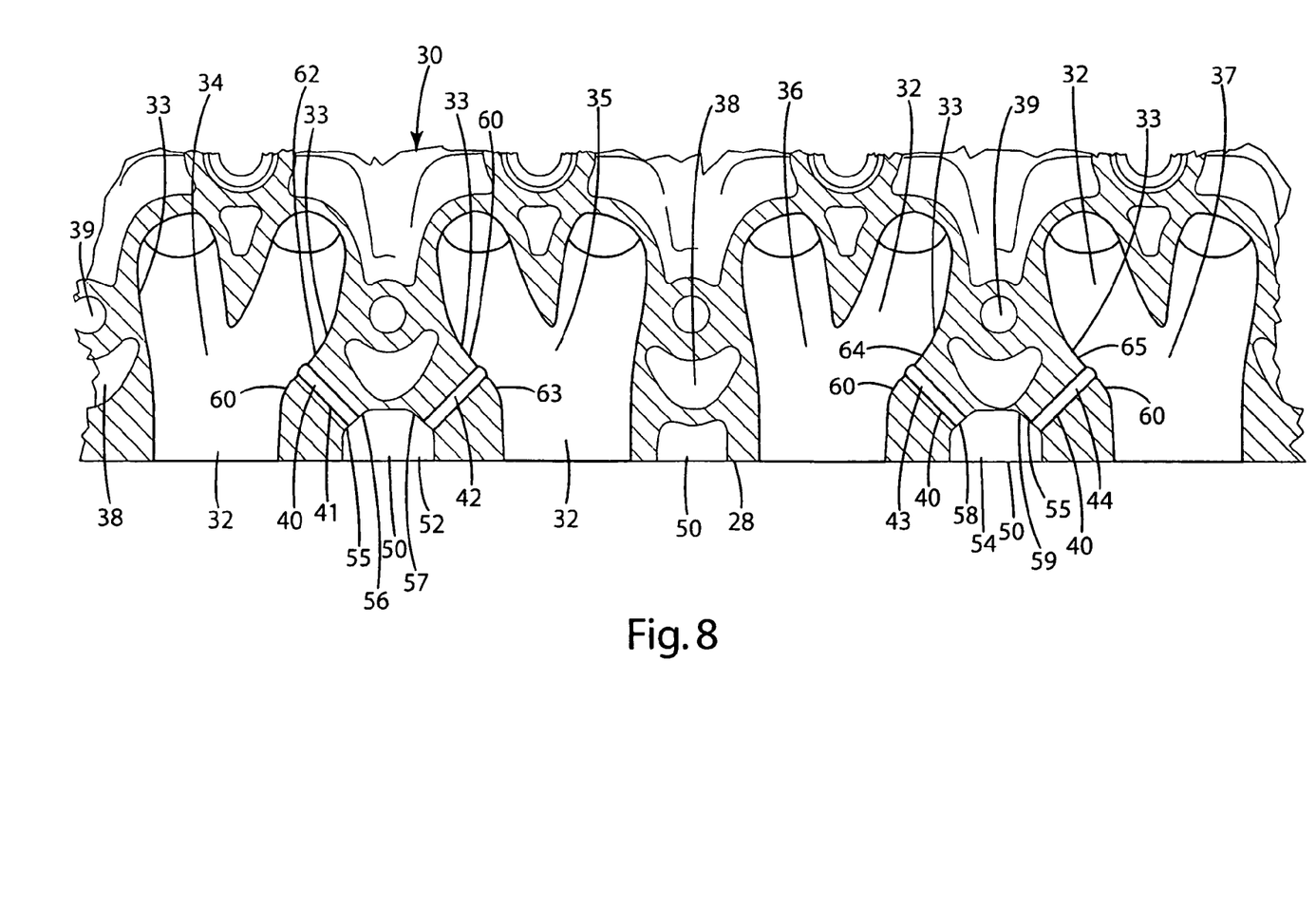
FIG. 8 is a sectional view of the cylinder head showing a third alternative embodiment of the cylinder head.
Figure 9:
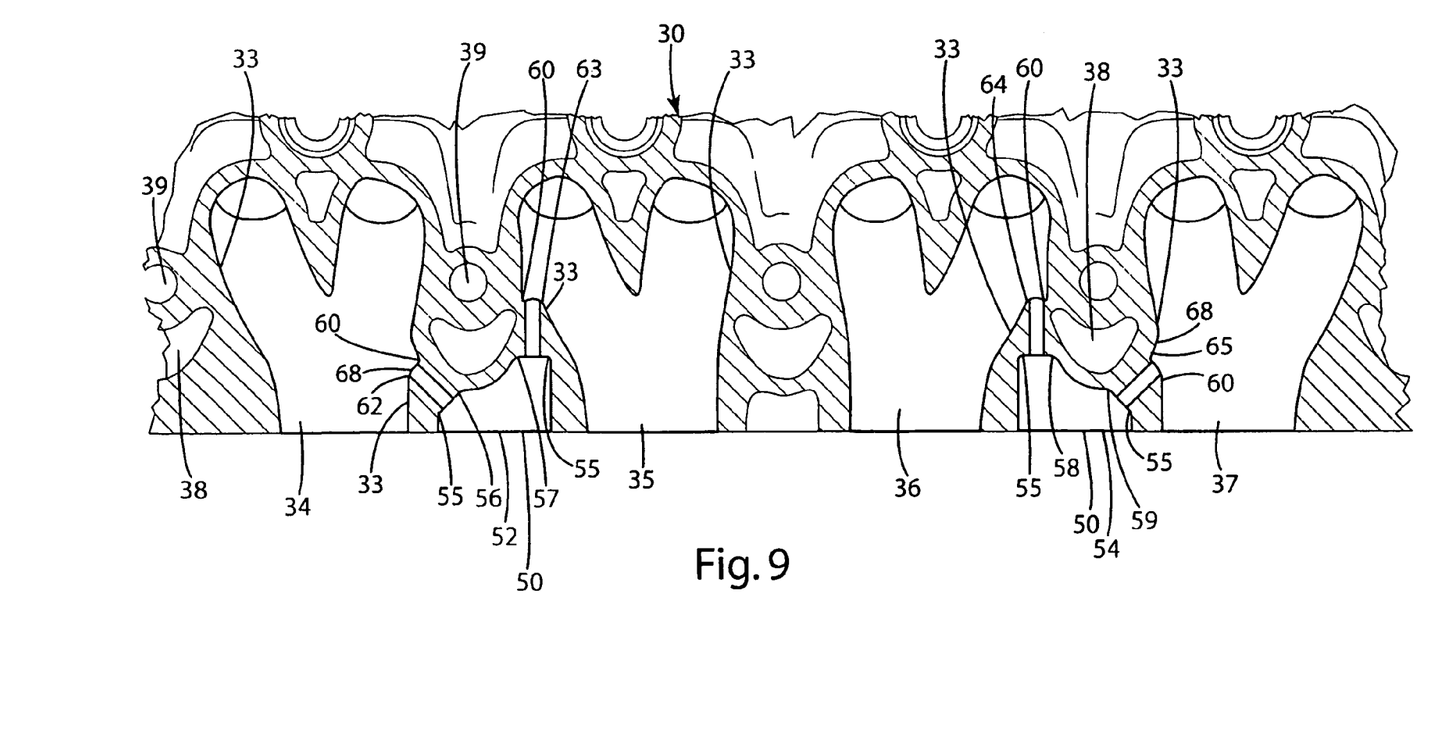
FIG. 9 is a sectional view of the cylinder head showing a fourth alternative embodiment of the cylinder head.
Figure 10:
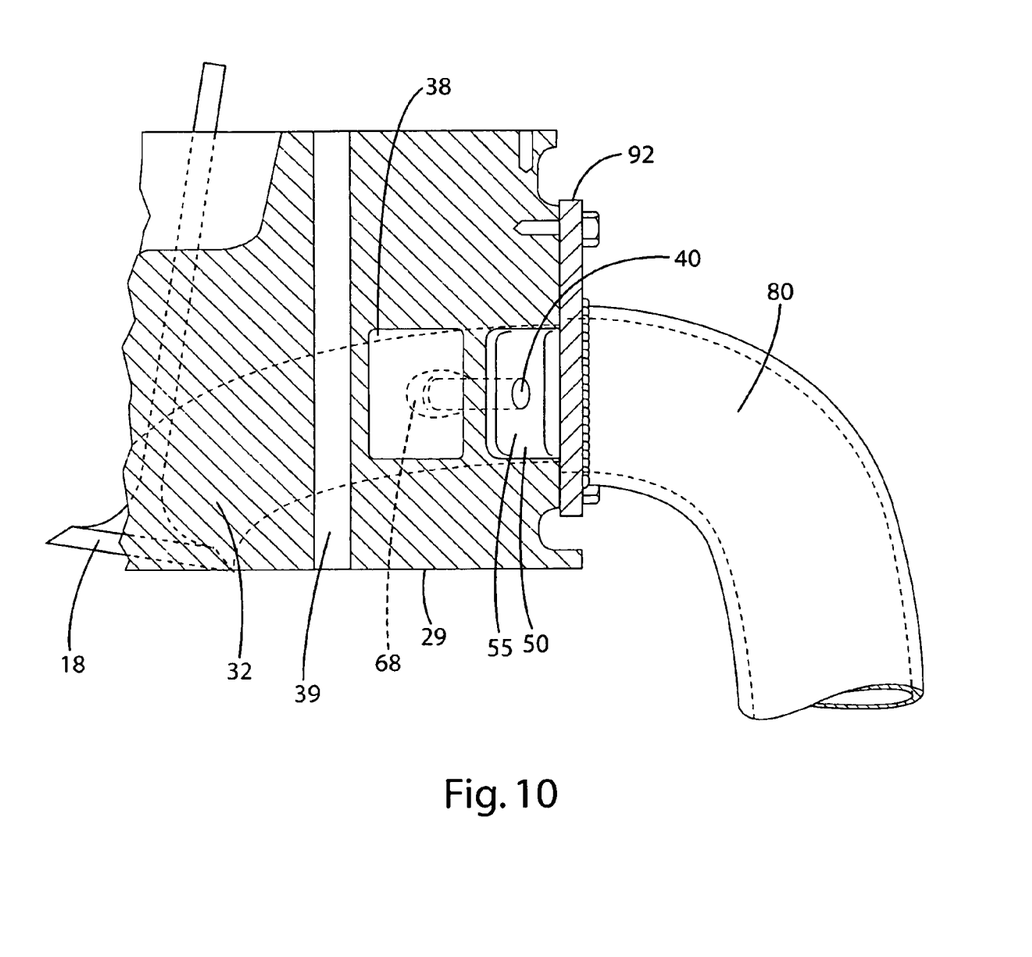
FIG. 10 is a sectional view of the cylinder head and attached exhaust header showing a second alternative embodiment of the exhaust system.

The exhaust ports 32 include exhaust port walls 33 (FIGS. 1-2, 4, 8-9 and 11). The exhaust port walls 33 form an exit surface 60 where the air passages 40 enter the exhaust ports 32. The exit surfaces 60 in the illustrated embodiment include a first exit surface 65, a second exit surface 64, a third exit surface 63, and a fourth exit surface 62. Of course, additional exit surfaces 60 may be added if additional air passages 40 are desired. The exit surfaces 60 are generally perpendicular to the axis of the air passages 40. The perpendicularity of the exit surfaces 60 to the axis of the air passages 40 allows for a more efficient, cost effective and quality manufacturing process by keeping the exit surface perpendicular to a drill bit that is forming the air passage 40. The exit surface 60 may be simply formed by the smooth port wall 33 by aligning the port wall 33 with the air passage 40, so that the axis of the air passage is in communication with the exhaust port 32 at a point where the exhaust port 33 wall is perpendicular to the axis of the air passage 40 (FIG. 8). It may also be desirous to cast a dimple 68 into the exhaust port wall 33, as illustrated in FIGS. 2, 4, 9, and 11. The cast dimple 68 ensures that the air passages 40 will exit at an approximately perpendicular position, regardless of the geometry of the exhaust walls 33, and may allow for use of a geometry that allows for better flow of the exhaust gases through the cylinder head 30 into the exhaust outlet system 80. Furthermore, use of a dimple 68 may optimize the exit location of the air passages 40 into the exhaust ports 32 to ensure the most efficient mixing of air with the exhaust gases to further improve emissions and complete combustion of the exhaust gases. Different exemplary exit locations of the air passage may be seen in FIGS. 2, 8, 9, and 11. In particular, FIG. 9 shows the second and third air passages 43, 42 optimized for closeness to the combustion chamber 22 to improve the efficiency of the secondary air system 10. It should be readily recognized that the geometry of the second and third air passages 43, 42 in FIG. 9 may be replicated for the first and fourth air passages 44, 41.

The exhaust outlet system 80 may be any type of exhaust system used on an internal combustion engine, attached to the engine and extending to the exhaust outlet (not shown) or catalytic converter. For vehicles, the exhaust system 80 is typically an exhaust manifold or an exhaust header, which goes to a catalytic converter (not shown). For ease of illustration, the drawings show for the exhaust system 80 an exhaust header in place of an exhaust manifold due to the open nature of exhaust headers. However, an exhaust manifold or other exhaust outlet systems may be easily substituted for the exhaust headers shown in the figures. The exhaust outlet system 80 generally includes a mounting flange 92. The mounting flange 92 is designed to seal to an exhaust gasket 90 (FIG. 1) and thereby provide a flow path for exhaust gasses from the internal combustion engine to the catalytic converter or tailpipe (not shown). The mounting flange 92 in the present invention is also designed to seal to the lightening pockets 50. The mounting flange 92 in the embodiment illustrated in FIG. 1 includes an air supply tube 84. The air supply tube 84 connects through air supply lines 16 to an air supply 14, as is schematically illustrated in FIG. 7. The air supply tube 84 is in communication with the associated lightening pocket 50 and provides air to the lightening pocket 50, which travels through the air passages 40 to the relative exhaust ports 32.

It should also be recognizable to one skilled in the art that if the cylinder head 30 is never drilled for air supply passages 40, the exhaust system 80 having the air supply tube 84 may still be used, as instead it will only be communicating with a lightening pocket and not the exhaust ports 32.

Figure 5:
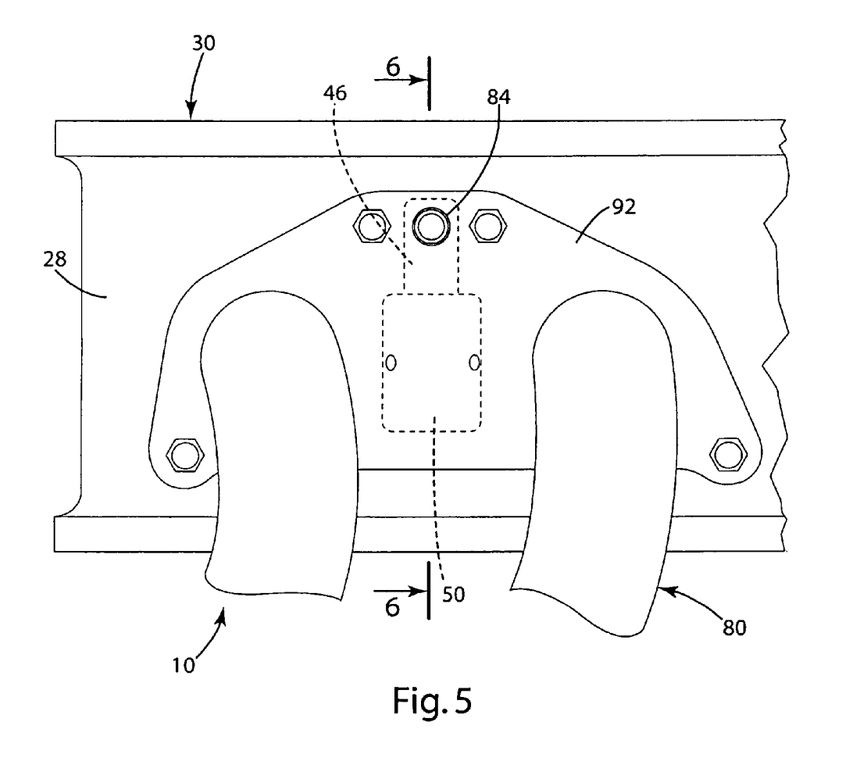
FIG. 5 is an elevational view of the cylinder head with an attached exhaust header, showing a second embodiment of the cylinder head.
Figure 6:
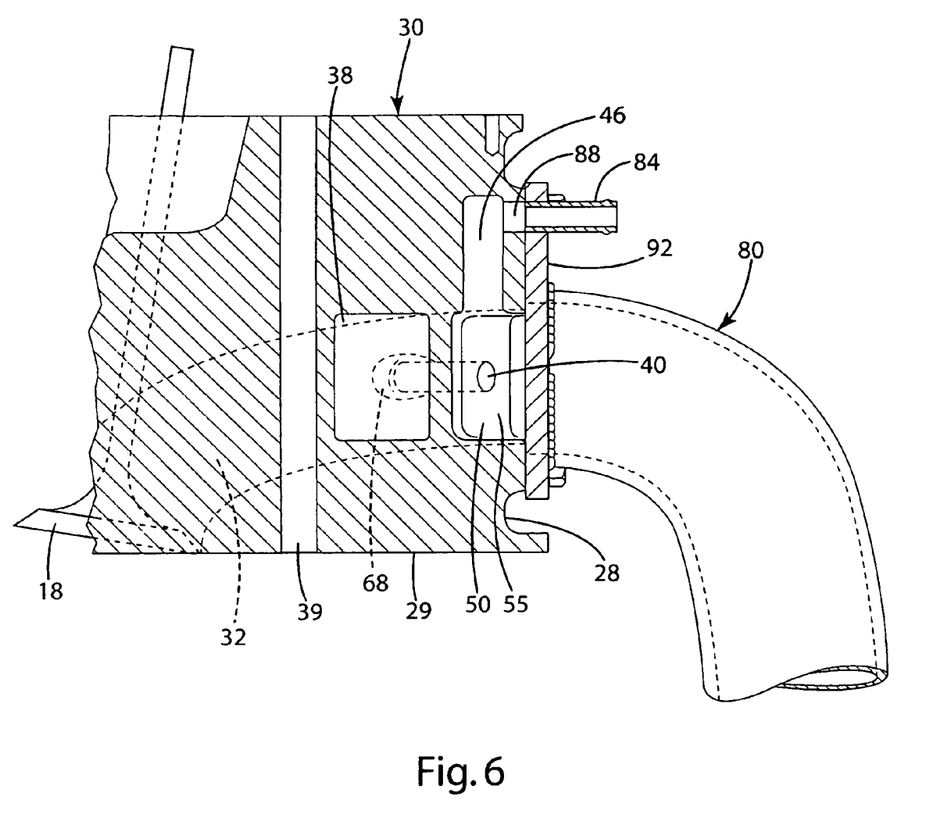
FIG. 6 is a sectional view of the second embodiment along lines 6-6 in FIG. 5.

An alternative embodiment of the lightening pocket 50 and cylinder head 30 is shown in FIGS. 5-7. The lightening pocket 50 includes a main chamber 51 and an air supply passage 46 extending upward from the main chamber 51. The air supply passage 46 may be in contact with an air entrance passage 88 that is drilled into the cylinder head 30 if a secondary air injection system 10 is desired, or cast in with the lightening pocket 50. Of course, the cylinder head 30 may be cast with the additional air supply passage 46, but still use the exhaust outlet system 80 and air supply tube 84 from FIG. 3 to provide air to the lightening pockets 50 for communication with the exhaust ports 32. Casting in the air supply passage 46, but not casting in the air entrance passage 88, allows for a greater variety of placement of the air supply tube 84 and a greater variety of exhaust outlet systems 80 with the use of a standard cylinder head 30.

The secondary air injection system 10 is added to an internal combustion engine to improve emissions. A cylinder head 30 capable of providing air to the exhaust ports 32 with minor and planned modifications is cast. The cast cylinder head 30 includes the lightening pockets 50 and entrance surfaces 55 and exit surfaces 60 that will be perpendicular to air passages 40, if the air passages 40 are to be added to the cylinder head 30. The cylinder head 30 may further include the periscope design, which is the additional air supply passage 46. Although it is advantageous, for ease of manufacture, to drill the cylinder head 30 for the air passages 40 before assembly into an internal combustion engine, the air passages 40 may be added after the cylinder head 30 is assembled onto the engine block 20 or as part of the complete engine 12.

Figure 3:
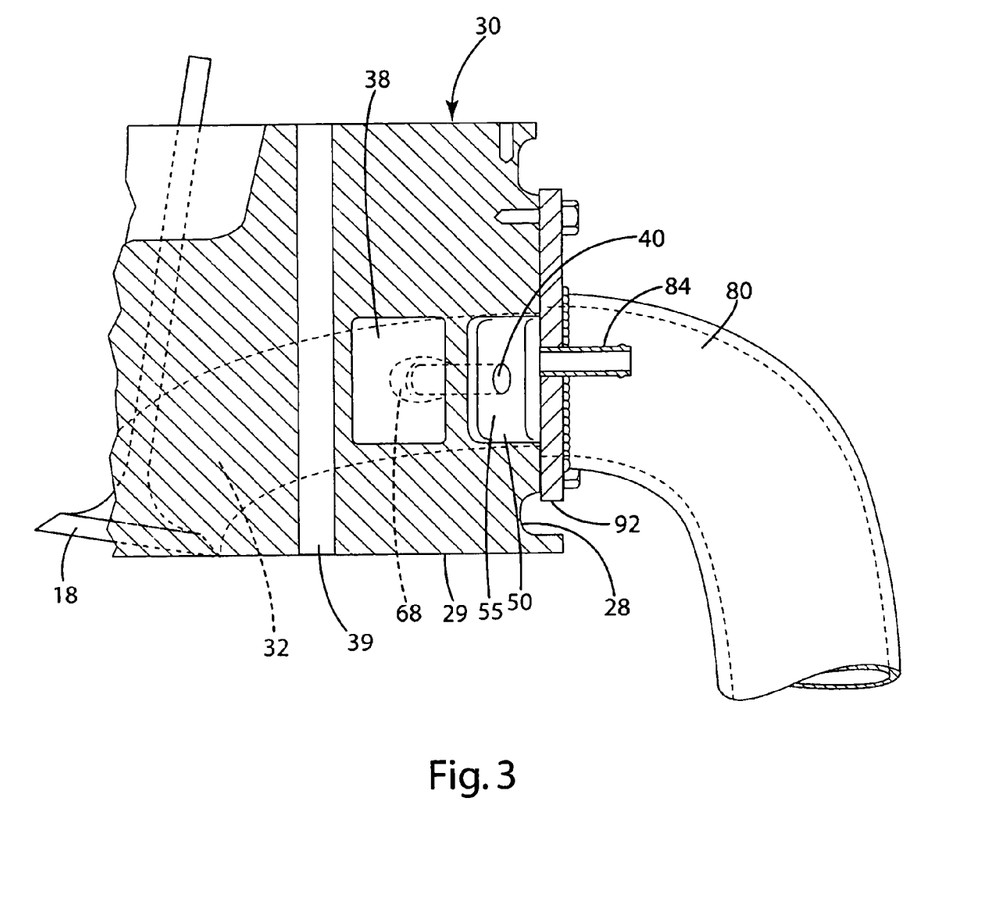
FIG. 3 is a sectional view of the cylinder head and an exhaust header.

An exhaust outlet system 80 is then added to the engine 12. The exhaust outlet system 80 may include the air supply tube 84 for the secondary air injection system 10, as shown in FIG. 3 or as shown in FIG. 7 may be formed to go around an air supply tube 84, not connected to the mounting flange 92.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A cylinder head for an engine comprising:
a first exhaust port and a second exhaust port;
a first lightening pocket located between said first and second exhaust ports;
a first air passage between said first exhaust port and said first lightening pocket;
wherein said cylinder head extending along a longitudinal axis, and having longitudinal side walls;
wherein said first and second exhaust ports having exhaust passage openings on one of said longitudinal side walls; and
wherein said first lightening pocket extending into one of said longitudinal side walls.

2. The cylinder head of claim 1 wherein first lightening pocket includes a first entrance surface approximately perpendicular to said first air passage.

3. The cylinder head of claim 1 wherein a second air passage extends between said first lightening pocket and said second exhaust port.

4. The cylinder head of claim 3 wherein said first lightening pocket includes a second entrance surface approximately perpendicular to said second air passage.

5. The cylinder head of claim 3 further including a second lightening pocket, a third exhaust port and a fourth exhaust port and wherein said second lightening pocket is located between said third and fourth exhaust ports and a third air passage extends between said second lightening pocket and said third exhaust port and a fourth air passage extends between said second lightening pocket and said fourth exhaust port.

6. The cylinder head of claim 1 wherein said first exhaust port includes an exhaust port wall and an exit surface proximate to said first air passage, said exit surface being approximately perpendicular to said first air passage.

7. The cylinder head of claim 6 further including a second exhaust port having a second exhaust port wall and a second air passage extending between said first lightening pocket and said second exhaust port wall, said second exhaust port wall including a second exit surface proximate to said second air passage and wherein said second exit surface is approximately perpendicular to said second air passage.

8. The cylinder head of claim 7 wherein said second exit surface is a dimple cast in said cylinder head.

9. The cylinder head of claim 1 wherein said first lightening pocket further defines an air supply passage.

10. The cylinder head of claim 9 wherein said cylinder head further includes an air entrance passage, wherein said air entrance passage is recessed from and blocked from said one of said first lightening pocket.

11. A cylinder head comprising:
a first side and a second side;
a first exhaust port extending between said first and second sides, wherein the first side defines a first opening of said first exhaust port and wherein the second side defines a second opening of said first exhaust port, wherein said first exhaust port including an exhaust port wall;
a first air passage extending between one of said first and second sides and said exhaust port wall, and wherein said first air passage is approximately perpendicular to a portion of said exhaust port wall proximate to said first air passage.

12. The cylinder head of claim 11 wherein said exhaust port wall includes a cast in dimple forming said portion of said exhaust port wall proximate to said first air passage.

13. The cylinder head of claim 11 further including a first lightening pocket communicating with said first air passage.

14. The cylinder head of claim 13 wherein said first lightening pocket includes a first entrance surface approximately perpendicular to said first air passage.

15. The cylinder head of claim 11 further including a second exhaust port and a second air passage between said first lightening pocket and said second exhaust port.

16. A secondary air system comprising:
a cylinder head having a first exhaust port, a first lightening pocket, wherein said lightening pocket is cast within the cylinder head and including an air supply passage, and a first air passage between said first exhaust port and said first lightening pocket;
an air supply operationally connected to said lightening pocket;
an exhaust outlet system connected to said cylinder head and including an air entrance passage between said cylinder head and said air supply; and
wherein said exhaust outlet system includes a recess and an air supply tube, wherein said air supply tube is coupled to said cylinder head and in communication with said air entrance passage, said air entrance passage communicating with said air supply passage.

17. The secondary air system of claim 16 wherein said first lightening pocket further includes a first entrance surface approximately perpendicular to said first air passage.

18. The secondary air system of claim 16 wherein said air supply passage extending approximately perpendicular to said first air passage and wherein said air supply passage is in communication with air supply and said first air passage.

19. The cylinder head of claim 9 wherein said lightening pocket includes a main chamber and an air entrance passage, said main chamber and said air entrance passage communicating with a first side and wherein said air supply passage is in communication with said main chamber and said air entrance passage.

* * * * *